United States Patent
Elliott

[15] 3,703,092
[45] Nov. 21, 1972

[54] ENGINE STARTER AND POWER TRANSMISSION INTERLOCK SYSTEM

[72] Inventor: Harold V. Elliott, Saginaw, Mich.
[73] Assignee: General Motors Corporation, Detroit, Mich.
[22] Filed: April 29, 1971
[21] Appl. No.: 138,481

[52] U.S. Cl. ..................70/248, 70/252, 180/114
[51] Int. Cl. ..........................B60r 25/02, B60r 25/06
[58] Field of Search ..70/252, 254, 248; 180/82, 103, 180/114

[56] References Cited

UNITED STATES PATENTS

| | | | |
|---|---|---|---|
| 3,490,255 | 1/1970 | Wight et al. | 70/248 X |
| 3,553,986 | 1/1971 | Ball et al. | 180/114 X |
| 3,566,632 | 3/1971 | Wall et al. | 70/252 X |

Primary Examiner—Robert J. Spar
Attorney—W. E. Finken and D. L. Ellis

[57] ABSTRACT

An interlock system for preventing energization of a vehicle engine starting motor except when the power transmission of the vehicle is in a zero power transmission range, the interlock system including a transmission range selector movable between a plurality of positions corresponding to the ranges of the transmission, a control member operatively connected to the vehicle ignition switch and movable between a plurality of positions corresponding to the various operative configurations of the ignition switch, a probe attached to the control member for bodily movement as a unit therewith and for limited universal movement relative thereto, and a keeper supported on the range selector for unitary movement therewith and having an aperture therein for reception of the probe. When the transmission is in a power transmitting range, the keeper is disposed across the path of motion of the probe to arrest movement of the control member before the ignition switch energizes the engine starting motor and when the transmission is in a zero power transmission range, the aperture is aligned with the probe so that movement of the control member is unimpeded. The limited universal movement capability of the probe effectively prevents the development of friction between the keeper and the probe so that there is no tendency of the latter to bind or stick in the aperture.

3 Claims, 4 Drawing Figures

PATENTED NOV 21 1972 3,703,092

INVENTOR.
Harold V. Elliott
BY
D. L. Ellis
ATTORNEY

3,703,092

ENGINE STARTER AND POWER TRANSMISSION INTERLOCK SYSTEM

This invention relates generally to automotive vehicle engine starting systems and in particular to means for preventing engine starting when the vehicle power transmission is in a power transmitting range.

Automotive engineers have long appreciated the desirability of interlocking the power transmission and the engine starting means of an automotive vehicle so as to condition engine starting on the transmission being in a non-power transmitting range. Accordingly, numerous systems have been devised to effect such interlock. One common variety of interlock system includes an electrical switch in series with the engine starting motor energizing switch, the electrical switch being coupled to the transmission selector so as to interrupt the starting motor electrical circuit when the transmission is in a power transmitting range. While this variety of system is functionally satisfactory, it lacks the simplicity and economy of a purely mechanical system wherein the starter motor energizing switch is physically blocked when the transmission is in a power transmitting range. Mechanical systems are, however, susceptible to friction which, in aggravated cases, can bind the elements of the interlock system so as to result in damage if normal vehicle operation is attempted. An interlock system according to this invention is a simple mechanical interlock system wherein the potential for friction induced malfunction is virtually eliminated.

The primary feature of this invention is that it provides a new and improved interlock system for inhibiting energization of an engine starting motor in an automotive vehicle when the power transmission of the vehicle is in a power transmitting range. Another feature of this invention is that it provides a new and improved interlock system of the mechanical type wherein the potential for friction induced malfunction is virtually completely eliminated. Yet another feature of this invention resides in the provision in the interlock system of a probe and keeper arrangement wherein a probe coupled to the starting motor energization switch cooperates with a keeper synchronized with the transmission range selector to physically prevent closing of the switch when the transmission is in a power transmitting range. A still further feature of this invention resides in the provision in the probe and keeper arrangement of a probe supported on a movable member for unitary movement with the member into and out of a receptacle in the keeper and for limited universal movement relative to the member, the limited universal movement inhibiting the development of friction producing forces between the keeper and the probe when the latter is situated in the receptacle.

These and other features of this invention will be readily apparent from the following specification and from the drawings wherein.

Figure 1:
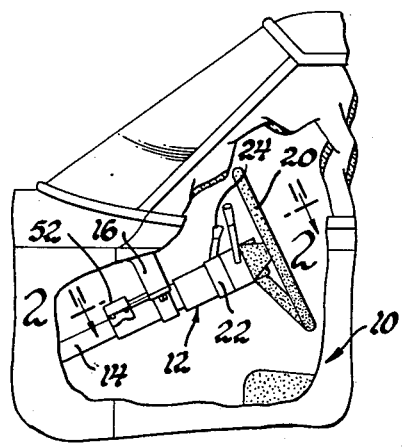
FIG. 1 is a fragmentary partially broken away side elevational view of an automobile vehicle body having an interlock system according to this invention.

Referring now to FIG. 1 of the drawings, an automobile vehicle body designated generally 10 includes a steering column structure 12 mounted in the forward passenger compartment and extending through the body firewall to the vehicle engine compartment, not shown. The steering column structure, as is conventional, includes an outer support column or tube structure 14 mounted on the body 10 by means of a bracket 16 on the instrument panel structure of the body and additionally by a similar bracket or fastener, not shown, on the firewall structure of the body. The support column 14 conventionally rotatably mounts therewithin a steering shaft 18, FIG. 2, which carries at its upper end a steering wheel 20. The support column further rotatably supports therewithin a range selector tube, not shown, connected at its lower end to the power transmission of the vehicle and carrying at its upper end a shift bowl 22 having a selector lever 24.

The steering column structure supports at its upper end a coincidental lock assembly actuable to simultaneously prevent rotation of the shift tube and shift bowl and the steering shaft, a full and complete description of the general structure and operating characteristics of the lock assembly appearing in U.S. Pat. No. 3,490,255, issued to Robert D. Wight et al. on Jan. 20, 1970 and assigned to the assignee of this invention. Basically, as seen best in FIGS. 2 and 3, the shift tube locking portion of the coincidental lock assembly includes a shift tube bolt 26 and a shift tube keeper 27. The bolt 26 has a plurality of rack teeth 28 formed thereon at one end, a generally centrally located notch 30, and a lug 32 at the other end and is slidably supported for bodily movement longitudinally of the steering column structure in a channel 34 in a die cast or similarly constructed stationary housing portion 36 rigidly connected to the support column 14.

Bodily movement of the shift tube bolt is controlled by a lock cylinder assembly 38 through a gear sector 40, the lock cylinder assembly including a sleeve 42 rigidly secured to the housing 36 within a boss 44 of the latter and rotatably supporting a lock cylinder 46. The lock cylinder is of generally conventional structure with a series of key operable tumblers and a side locking bar, not shown, extensible by withdrawal of a key 48 to selectively lock the cylinder in a fixed rotary position within the sleeve 42. The gear sector 40 is coupled to the lock cylinder for unitary rotation therewith and drivingly engages the rack teeth on the shift tube bolt so that rotation of the lock cylinder produces concurrent bodily movement of the shift tube bolt.

An ignition switch control member or rod 50 is attached to the end of the shift tube bolt 26 and extends down the steering column structure to an ignition switch 52 rapidly supported on the steering column structure below bracket 16, FIG. 1. A conventional contacting element, not shown, within the ignition switch is movable by the rod 50 between plurality of positions corresponding to the various operating configurations of the ignition switch including an "off" configuration wherein the ignition circuit is interrupted, a "run" configuration wherein the ignition circuit is completed, and a "start" configuration wherein the ignition circuit is completed and the engine starting motor energized. The ignition switch is positioned on the steering column structure relative to the lock cylinder assembly such that when the latter is locked, the ignition switch is in the "off" configuration. From the locked position manual rotation of the lock cylinder 46 in a counterclockwise rotation direction, FIG. 4, effects leftward bodily movement of the shift tube bolt 26 and rod 50 which movement effects successive alteration of the ignition switch configuration from "off" to "run" and then to "start." Conventional spring means, not shown, function to maintain the ignition switch in the "run" configuration once the "start" configuration is achieved and the lock cylinder subsequently released.

Figure 2:
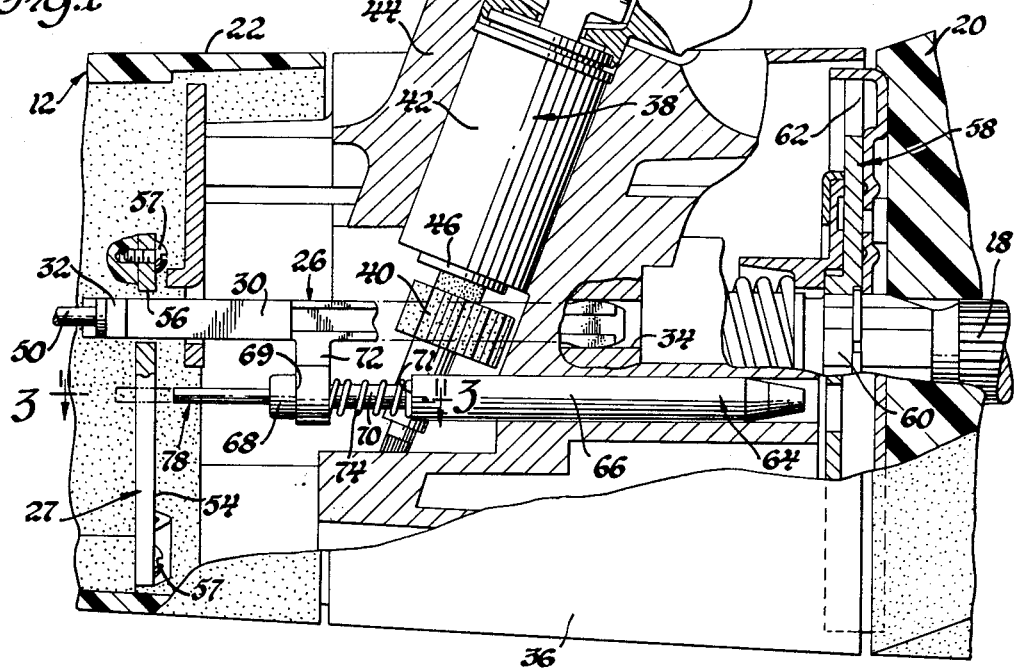
FIG. 2 is an enlarged partially broken away view taken generally along the plane indicated by lines 2—2 in FIG. 1.
Figure 4:
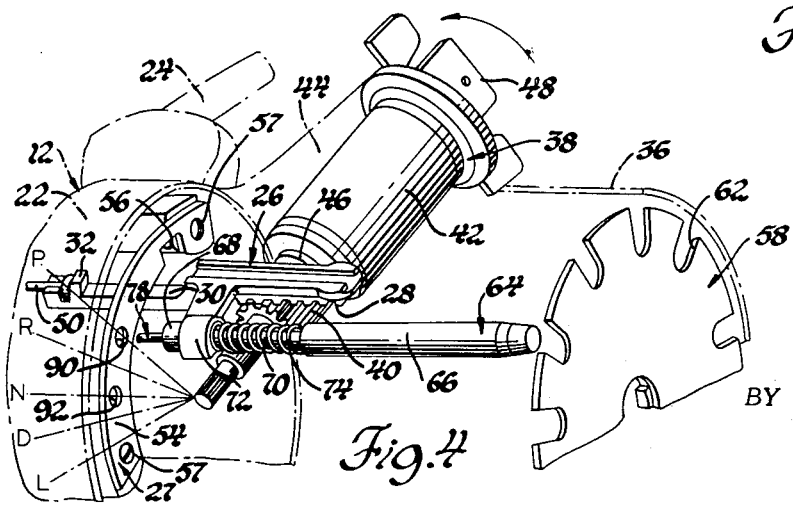
FIG. 4 is a fragmentary perspective view of a portion of FIG. 2 showing the probe and keeper arrangement.

As seen best in FIGS. 2 and 4, the shift tube keeper 27 of the coincidental lock assembly is a generally arcuately shaped flat plate having a front face 54 and a downwardly opening notch 56 adapted to receive lug 32 on the shift tube bolt. The keeper is rigidly attached to the shift bowl 22 by a pair of screws 57 for unitary or synchronous movement therewith, the keeper being oriented in a plane extending perpendicularly to the longitudinal axis of the steering column structure. The shift bowl 22 is rotatable relative to the stationary housing portion 36 between a plurality of angular positions, the positions for a typical automatic transmission corresponding to the "Park," "Reverse," "Neutral," "-Drive" and "Low Drive" operating ranges of the transmission. In the "Neutral" and "Park" ranges no power is transmitted and in the latter range the vehicle drive shaft is immobilized.

The keeper 27 is positioned on the shift bowl 22 such that in the "Park" range of the transmission the notch 56 is aligned on the path of motion of the shift tube bolt 26. Further, the keeper is positioned longitudinally on the steering column structure such that when the ignition switch is in the "off" configuration, the lug 32 on the shift tube bolt is situated within the notch 56. Accordingly, the ignition switch can only be locked in the "off" configuration when the transmission is in the "-Park" range and once the switch is so locked the shift bowl is immobilized. Similarly, when the ignition switch is placed in either the "run" or "start" configurations, the notch 30 in the shift tube bolt 26 underlies the keeper 27 so that the shift bowl 22 is freely rotatable.

Coincidental with the locking and unlocking functions respective to the shift bowl 22 and the ignition switch 52, the steering shaft 18 is placed in locked or unlocked condition. As seen best in FIGS. 2 and 4, a keeper 58 is mounted by a spline or like connection 60 on the upper end of the steering shaft 18. The peripheral edge portions of the keeper 58 are provided with a series of recesses or notches 62 for receiving the head of a steering shaft lock bolt 64. The lock bolt 64 is generally cylindrical in configuration with an elongated head end 66 and a foreshortened tail end 68 joined in spaced relation by a reduced shank portion 70 bounded by a pair of shoulders 69 and 71, FIG. 2. A forked arm 72 integral with the shift tube bolt 26 slidably engages the steering shaft lock bolt 64 on the reduced shank portion 70. A compression spring 74 coiled about the shank portion 70 bears at one end against the forked arm 72 and at the other end against shoulder 71 so as to bias the forked arm against the shoulder 69. Accordingly, upon leftward bodily movement of the shift tube bolt 26 in response to corresponding rotation of the lock cylinder 46, the lock bolt 64 is moved leftwardly from a locking position, not shown, wherein the head end 66 projects into one of the recesses 62 in the steering shaft keeper 58 to immobilize the steering shaft, and an unlocked position, FIG. 2, the unlocked position corresponding to the "run" configuration of the ignition switch. Opposite rotation of the lock cylinder 46 effecting rightward bodily movement of the shift tube bolt 26 induces rightward movement of the lock bolt 64 through the forked arm 72 and spring 74.

Figure 3:
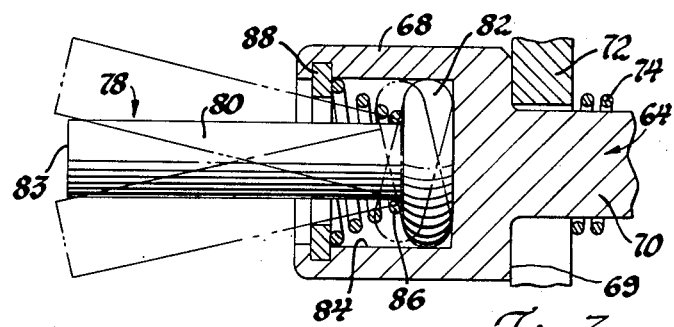
FIG. 3 is an enlarged sectional view taken generally along the plane indicated by lines 3—3 in FIG. 2.

As described hereinafter, the ignition switch 52 and shift bowl 22 are interlocked to preclude energization of the engine starting motor except when the transmission is in the "Park" or "Neutral" ranges. Referring to FIGS. 2, 3 and 4, the interlock system between the ignition switch and shift bowl includes a probe 78 having a cylindrical body portion 80 terminating at one end in an enlarged circular bearing 82 and at the other end in a surface 83. The bearing 82 is generally closely received within a cylindrical counterbore or cavity 84 in the tail end 68 of the lock bolt 64. A conical compression spring 86 is disposed about the probe body 80 and bears at one end against the circular bearing 82 and at the other end against an annular retaining ring 88 suitably mounted on the tail end 68 adjacent the open end of cavity 84. The probe 78 is thus supported in axial alignment on the steering shaft lock bolt 64 for unitary bodily movement therewith longitudinally of the steering column structure and for limited universal movement relative thereto, the universal movement being limited by engagement between the inner diameter of the retaining ring 88 and the probe body portion 80 as shown in broken lines in FIG. 3.

As seen best in FIGS. 2 and 4, the interlocking system further includes a pair of probe receptacles in the form of clearance apertures 90 and 92 in the keeper 27. The probe receptacles are situated on the keeper 27 such that in the "Park" and "Neutral" ranges of the transmission, respectively, the receptacles 90 and 92 are aligned on the path of motion traversed by the probe during bodily movement of the lock bolt 64. Accordingly, whenever either of the receptacles is so aligned the probe is allowed to project into he aligned receptacle so that movement of the lock bolt 64 is unimpeded. Absent such alignment, however, the solid portion of the front face 54 of the keeper 27 lies across the path of motion of the probe so that leftward bodily movement of the lock bolt is arrested by interference between surface 83 of the probe and front face 54. Further, when the probe is received within either of the receptacles, the limited universal movement capability of the former effectively inhibits the build up of significant laterally directed forces between the edge of the receptacle and the body portion 80 of the probe so that no frictional resistance to withdrawal of the probe develops.

A typical operational sequence of the coincidental lock assembly and the interlock system normally begins when an operator enters the vehicle and inserts key 48 into the lock cylinder in preparation for starting the engine. Initially the ignition switch is in the "off" configuration with lug 32 on the shift tube bolt 26 preventing movement of the shift bowl from the "Park" range and lock bolt 64 preventing rotation of the steering shaft. Rotation of the lock cylinder in the appropriate direction moves the shift tube bolt leftward to the position shown in FIG. 2 wherein the shift bowl is released for rotation, the lock bolt 64 being simultaneously moved leftward by forked arm 72 to the position shown in FIG. 2 wherein the steering shaft is released for rotation and the surface 83 on the probe 78 lies adjacent front face 54 of the keeper 27. If the shift bowl remains in the "Park" range or is rotated to the "Neutral" range, further rotation of the lock cylinder moves the shift tube bolt 26 further leftward until the "start" configuration of the ignition switch is achieved, this movement being accompanied by movement of the probe 78 into an appropriate one of the receptacles as shown in broken lines in FIG. 2. If the shift bowl is rotated to one of the "Reverse," "Drive," or "Low" ranges before the engine is started and while the ignition switch is in the "run" configuration, further rotation of the lock cylinder initiates interference between the probe 78 and flat face 54 of the keeper, the interference immediately arresting movement of the lock bolt 64 and shift tube bolt 26 before the "start" configuration of the ignition switch is achieved.

Assuming now that the "start" configuration of the ignition switch has been achieved and the probe 78 is in one of the receptacles, any minor misalignment between the probe and the receptacle is compensated for by the universal movement of the probe so that there is no tendency for the latter to bind in the receptacle. Consequently, when the key 48 is released, spring 74 carries the lock bolt 64 back to the position shown in FIG. 2 concurrently with similar return movement of the shift tube bolt 26. It will, of course, be apparent that if binding occurred, rotation of the shift bowl to a power transmitting range would likely severely damage the interlock system.

When it is desired to terminate operation of the vehicle, the shift bowl 22 is placed in the "Park" range and the operator then merely rotates the lock cylinder in the opposite direction in a conventional manner to return the shift tube bolt 26 and the lock bolt 64 to their original positions. Finally, the key 48 is withdrawn to lock the shift bowl and steering shaft in their immobilized non-operative positions.

Having thus described the invention, what is claimed is:

1. In a lock assembly for a vehicle having an engine, a starting motor adapted for intermittent energization to start said engine, a power transmission, and a transmission range selector movable between a plurality of positions corresponding to the various operating ranges of said transmission including a range of zero power transfer, said lock assembly including a control member adapted for bodily movement by a lockable actuator to a position effecting energization of said starting motor, a probe means attached to said control member for unitary movement therewith, and an abutment means adapted for synchronous movement with said range selector and including an impenetrable surface disposed across the path of motion of said probe means to arrest bodily movement of the latter and of said control member before energization of said starting motor is effected except in the position of said range selector corresponding to the zero power transfer range of said transmission wherein a receptacle means in said abutment means receives said probe means to permit passage of the latter through said impenetrable surface, the improvement comprising, means operative to permit universal movement of said probe means relative to said control member under the influence of forces directed generally laterally of said probe means thereby to prevent the development of substantial friction between said probe means and said receptacle means when the former is received in the latter.

2. In a vehicle having an engine including a starting motor adapted for momentary energization to start said engine, a power transmission, a steering column structure, a transmission range selector supported on said steering column structure for rotary movement between a plurality of positions corresponding to the various operating ranges of said transmission including a range of zero power transfer, and an ignition switch actuable between an inoperative "off" configuration and an operative "run" configuration energizing the ignition circuit of said engine and an operative "start" configuration simultaneously energizing the ignition circuit and said starting motor of said engine, a mechanical interlock system comprising, an ignition switch control member, means operatively attaching said control member to said ignition switch, means supporting said control member in said steering column structure for bodily movement longitudinally of said steering column structure between a plurality of positions corresponding to the various configurations of said ignition switch, manually controlled lockable actuator means adapted to move said control member between the positions thereof, an elongated probe member, means connecting said probe member to said control member for unitary longitudinal bodily movement therewith and for limited universal movement relative thereto, spring means biasing said probe member toward a position aligned along a longitudinal axis of said steering column structure, abutment means defining an impenetrable surface having an aperture therein adapted to closely receive said probe member, and means supporting said abutment means on said range selector for unitary movement therewith and with said impenetrable surface disposed across the path of motion traversed by said probe member during movement of said control member so that said probe member is engageable on said impenetrable surface to arrest movement of said control member before the "start" configuration of said ignition switch is achieved, said aperture being situated on said abutment means for alignment on the path of motion of said probe in the position of said range selector corresponding to the zero power transfer range of said transmission thereby to permit actuation of said ignition switch to the "start" configuration by allowing passage of said probe through said impenetrable surface.

3. In a vehicle having an engine including a starting motor adapted for momentary energization to start said engine, a power transmission, a steering column structure including a rotatable steering shaft adapted to control the path of motion of said vehicle, a transmission range selector supported on said steering column structure for rotary movement between a plurality of positions corresponding to the various operating ranges of said transmission including a range of zero power transfer, and an ignition switch actuable between an inoperative "off" configuration and an operative "run" configuration energizing the ignition circuit of said engine and an operative "start" configuration simultaneously energizing the ignition circuit and said starting motor of said engine, a range selector keeper defining an impenetrable surface having a notch therein, means supporting said selector keeper on said range selector for unitary movement therewith, a range selector lock bolt having a lug thereon adapted for reception in said keeper notch, means operatively connecting said selector lock bolt to said ignition switch, means supporting said selector lock bolt on said steering column structure for bodily movement longitudinally of the latter between a plurality of positions corresponding to the various configurations of said ignition switch, said lug being received in said keeper notch in a predetermined position of said range selector and in the position of said selector lock bolt corresponding to the "off" configuration of said ignition switch thereby to immobilize said range selector, lockable actuator means supported on said steering column structure and adapted for selective manual rotation, means connecting said actuator means to said selector lock bolt for effecting bodily movement of said selector lock bolt between the various positions thereof in response to rotation of said actuator means and for effecting immobilization of said selector lock bolt in the "off" configuration of said ignition switch, the combination comprising, a steering shaft lock bolt having a cavity therein, a keeper plate on said steering shaft, means supporting said shaft lock bolt on said steering column structure for bodily movement longitudinally of the latter, means connecting said shaft lock bolt to said selector lock bolt for unitary bodily movement with the latter between a plurality of positions corresponding to the various configurations of said ignition switch, said shaft lock bolt in the position thereof corresponding to the "off" configuration of said ignition switch engaging said keeper plate to immobilize said steering shaft, an elongated probe, means supporting said probe on said shaft lock bolt in said cavity therein for unitary bodily movement therewith in a path of motion intersecting said impenetrable surface defined by said range selector keeper and for limited universal movement relative to said shaft lock bolt, spring means biasing said probe toward a position aligned along a longitudinal axis of said shaft lock bolt, and means defining an aperture in said range selector keeper adapted to closely receive said probe, said aperture being situated on said selector keeper such that said probe is engageable on said impenetrable surface to arrest movement of said shaft lock bolt and said selector lock bolt before the "start" configuration of said ignition switch is achieved except when said range selector is in the position thereof corresponding to the zero power transfer range of said transmission in which portion said aperture is aligned on the path of motion of said probe thereby to permit actuation of said ignition switch to the "start" configuration by allowing passage of said probe through said impenetrable surface.

* * * * *